Oct. 1, 1957 J. KOLLMAN 2,808,021
MATERIAL FEEDING AND DISTRIBUTING APPARATUS
Filed Jan. 26, 1956 3 Sheets-Sheet 3
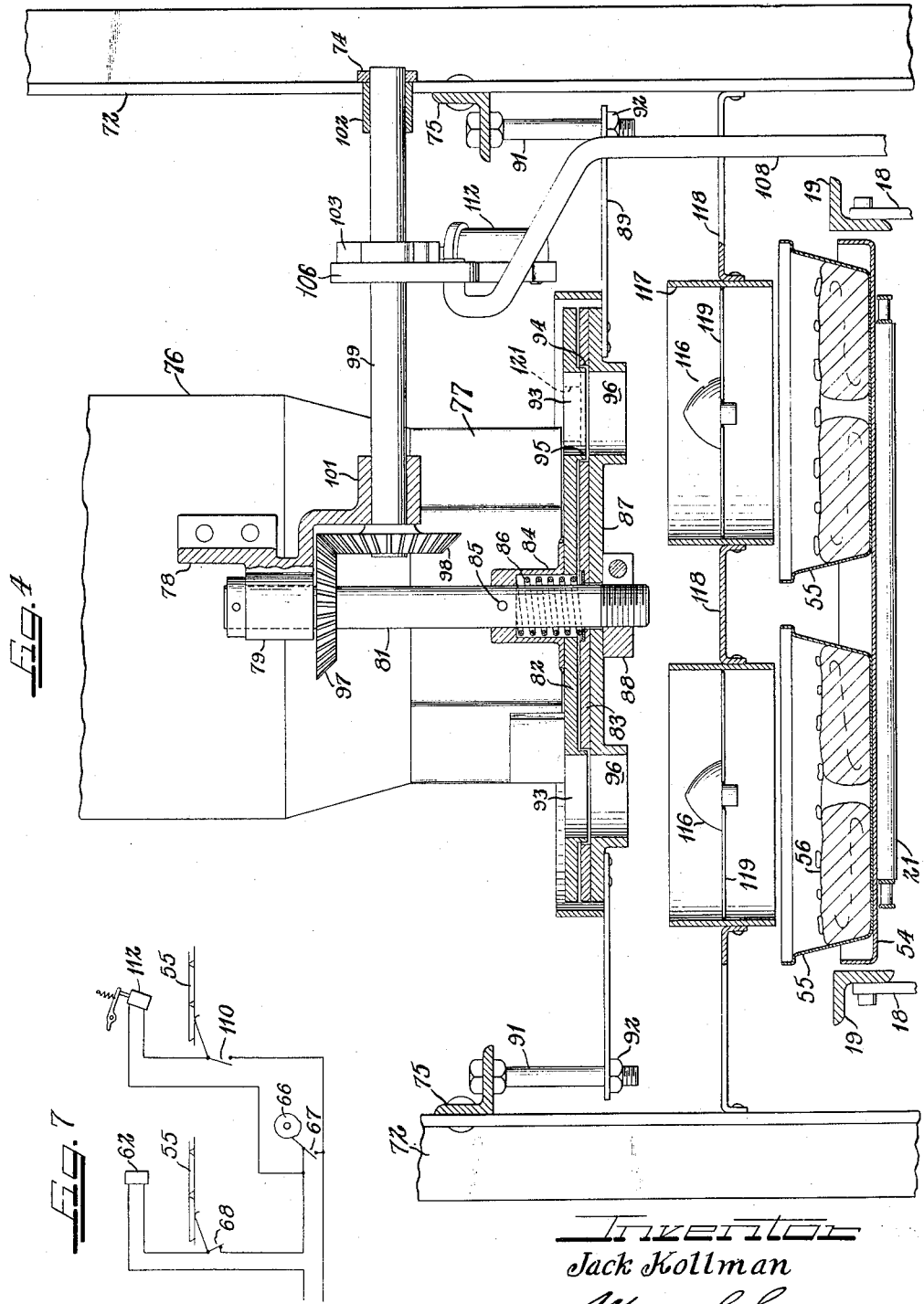
Inventor
Jack Kollman : 2,808,021
Patented Oct. 1, 1957

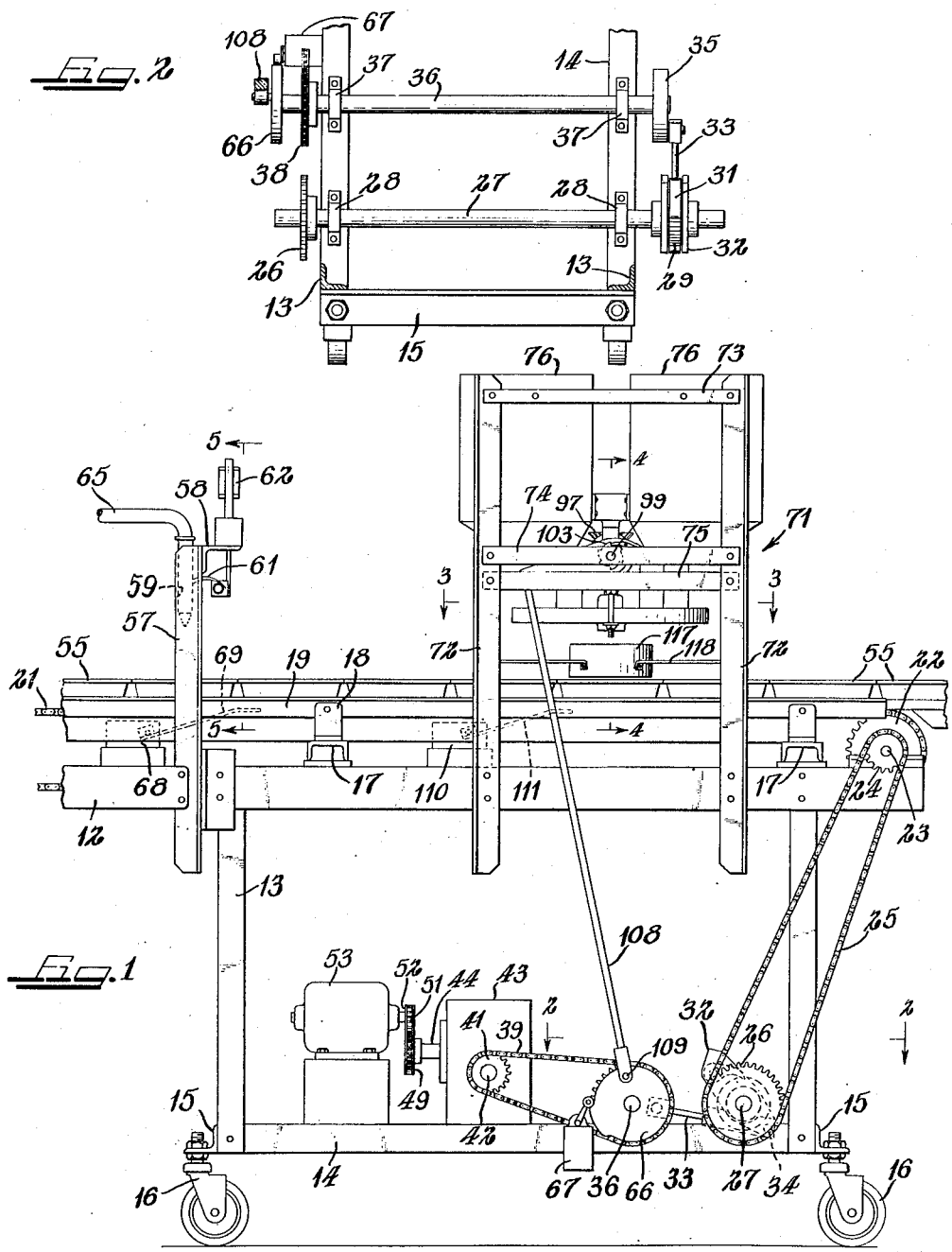

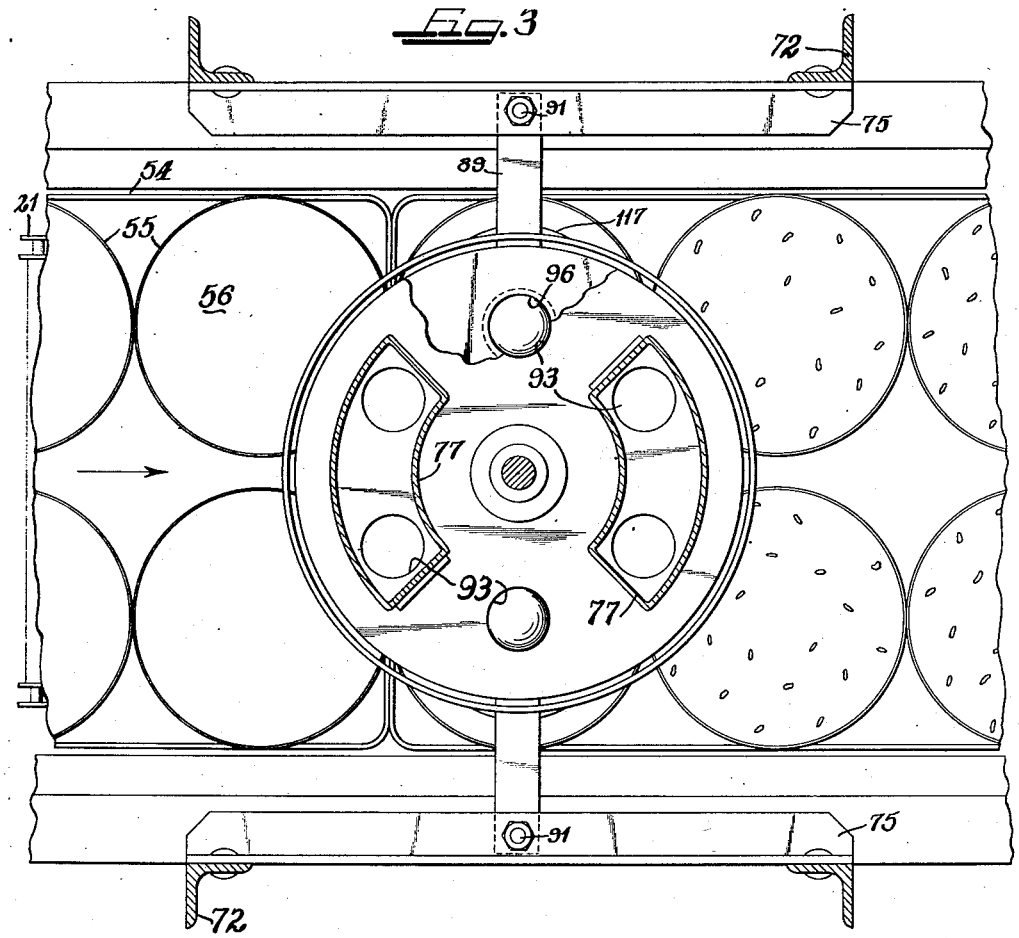
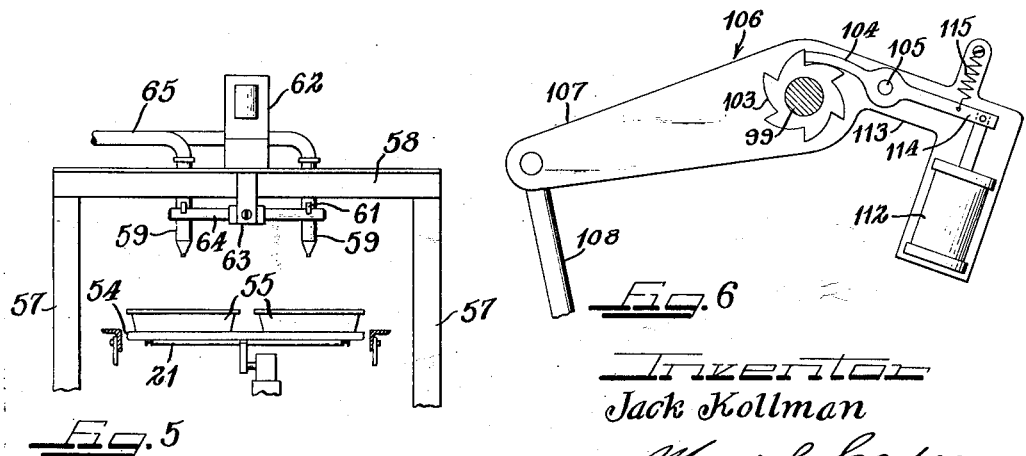

2,808,021

MATERIAL FEEDING AND DISTRIBUTING APPARATUS

Jack Kollman, Chicago, Ill., assignor, by mesne assignments, to Kitchens of Sara Lee, Inc., Chicago, Ill., a corporation of Maryland Application January 26, 1956, Serial No. 561,403

9 Claims. (Cl. 118—16)

The invention relates to improvements in apparatus for feeding and distributing material on articles advanced through the apparatus and is more particularly concerned with mechanism for spray coating and for distributing a measured quantity of nut meats or other material uniformly over the top surface of a bakery product or similar article.

Bakery products, such as coffee cake, frequently are provided with a quantity of nut meats or other topping material dispersed over its top surface. It is important from the standpoint of economy and also to the appearance of the product that the nut meats or other material be distributed on the products in substantially uniform quantities and that they be more or less evenly distributed over the entire surface thereof. Such measured even distribution has been difficult of attainment by the use of apparatus heretofore available.

The present apparatus includes mechanism for measuring out the required quantity of nut meats, which quantity can be varied upon slight adjustment of the mechanism to suit specific requirements, and to then discharge the measured quantity upon the product as the latter is conveyed through the apparatus. This is accomplished automatically by advancing, at incremental stages, a continuous stream of products beneath the distributing mechanism and then causing the mechanism to be actuated to discharge the required quantity of nut meats while the product conveying means is at rest. The apparatus also includes means operable in conjunction with the conveyance of products through the apparatus for spraying a film of liquid wash, such as egg wash, onto the product prior to the deposit of the nut meats thereon. Although reference is made throughout the present description to the measuring and distributing of nuts it will be apparent that the apparatus may be used to distribute any material that may be measured volumetrically.

It is therefore an object of the invention to provide novel means for spraying a liquid wash and for distributing a measured quantity of nut meats or like material onto a product advanced through the apparatus.

Another object is to provide a novel construction and assembly for a distributing mechanism of the character referred to.

Another object is to provide novel means to permit the capacity of the measuring device in the distributing mechanism to be varied so as to adapt the mechanism for use in association with products of different sizes.

Another object is to provide novel means for controlling the operation of the mechanism so as to stop its operation when no product is in position to receive the material to be discharged therefrom.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a fragmentary side elevational view of the apparatus.

Fig. 2 is a horizontal sectional plan view taken substantially on line 2—2 of Fig. 1.

Fig. 3 is an enlarged horizontal sectional plan view taken substantially on line 3—3 of Fig. 1.

Fig. 4 is an enlarged vertical sectional view taken substantially on line 4—4 of Fig. 1.

Fig. 5 is a vertical transverse sectional view taken on line 5—5 of Fig. 1.

Fig. 6 is an enlarged detail view showing the ratchet and pawl operating mechanism.

Fig. 7 is a schematic view of the electrically actuated control means.

Referring to the accompanying drawing, the apparatus embodying the present invention is mounted upon a suitable frame structure including longitudinal stringers 12 having depending therefrom vertical legs 13, the lower ends of which are rigidly mounted in a substantially rectangular frame structure including longitudinal and transverse angles 14 and 15 respectively, which frame structure may be supported on suitable casters 16. The longitudinal stringers 12 are joined together by transverse channels 17 having upstanding lugs 18 thereon to which are connected transversely spaced guide rails 19 between which the upper reach of an endless conveyor 21 is arranged. The conveyor 21 is an open mesh type of endless conveyor trained at one end over a guide sprocket 22 mounted on a driven shaft 23. A similar guide sprocket, not shown, is provided at the other end of the frame structure.

The shaft 23 carries firmly thereon a sprocket 24 over which is trained a chain 25 that is also trained over a sprocket 26 mounted firmly on a shaft 27 supported in suitable journals 28 (Fig. 2) mounted on the base frame structure 14—15. As is best shown in Fig. 2, the shaft 27 extends transversely of the frame structure 14—15 and carries firmly on its rear end a ratchet 29 having a pawl 31 associated therewith. The pawl 31 is journaled in a bracket 32 mounted for loose reciprocal rotation on the shaft 28. A link 33 is connected at one end, as at 34, to the bracket 32 and at its other end to an eccentric 35 mounted on one end of a transverse shaft 36 journaled in bearing blocks 37 on the frame structure 14—15. The other end of the shaft 36 carries a sprocket 38 over which is trained a drive chain 39 that is also trained over a sprocket 41 mounted on a driven shaft 42 projecting outward from a gear box 43. A stud shaft 44 also projects outwardly of one wall of the gear box 43 and it carries thereon a sprocket 49 having trained thereover a chain 51 which is also trained over a sprocket 52 on the shaft of a motor 53.

When the motor is in operation the shaft 27 is rotated incrementally in response to reciprocal operation of the pawl 31 so as to advance the endless conveyor 21 at staged increments in a direction from left to right as shown in Fig. 1. The upper reach of the endless conveyor 21 is adapted to have placed thereon an endless series of trays 54 each of which, in the present disclosure, carries a plurality of pans 55 within each of which is a bakery product such as for example a coffee cake 56. Upon referring to Figs. 3 and 4 it will be observed that there is provided two continuous rows of bakery products 56 which advance at uniform rates of speed with the conveyor so as to successively position each pan 55 beneath various mechanism now to be described and which are adapted to deposit thereon a thin wash of egg white or the like prior to the deposit of a scattering of nut meats over the top surface of the bakery product.

As previously noted, the apparatus includes novel electrically actuated mechanism for spraying each product, as it advances with the conveyor 21, with an egg white solution so as to glaze the top surface of said product. such means is best illustrated in Figs. 2 and 5. As there shown the frame structure has mounted on each of its side stringers 12 an upright standard 57 that extends a considerable distance above the top reach of the conveyor 21, which standard 57 are connected at their upper ends by a transversely extending bar or bridge 58. This bar has rigidly mounted thereon and depending therefrom a pair of valve controlled spray nozzles 59 each including an operating lever 61 projecting out of the side thereof into the area beneath the bar 58. Mounted upon the bar 58 midway between the spray nozzles 59 is a solenoid 62 having its core 63 extending downwardly and carrying on its lower end a rod 64 which projects on either side thereof laterally and has its free ends located beneath the levers 61. When the parts are in the positions illustrated in Fig. 5 the levers 61 are positioned to close the valve elements in the spray nozzles 59; however, when the solenoid 62 is energized the core 63 thereof is pulled upwardly rapidly carrying therewith the rod 64 for moving the levers 61 into valve-open position whereupon liquid egg white, delivered to the spray nozzles 59 through a conduit 65 from any suitable source, is sprayed downwardly onto the articles therebeneath.

The solenoid 62 is adapted to be energized in synchronism with incremental movement of the conveyor belt 21 so that each time articles come to rest in vertical alignment beneath the spray nozzles, said nozzles are opened to discharge the liquid egg wash thereover. This is accomplished, in the present instance, by providing a cam element 66 (Fig. 1) on the shaft 36 having a high land thereon of sufficient length to cause a normally open switch 67, connected in the circuit to the solenoid, to close momentarily each time the shaft 36 makes one complete revolution. In order to prevent the discharge of egg wash at any time when there is no tray 54 beneath the spray nozzles, the circuit to said solenoid also includes a switch 68 that normally is open but which is held closed at all times when there are trays 55 on the conveyor belt by means of an operating arm or finger 69 that is held depressed by the presence of a tray 55 thereover. The switch-solenoid circuit is best illustrated in Fig. 7.

Pans 55 containing products which have been sprayed while passing beneath the spray nozzles 59 advance in a direction toward the right in Fig. 1 and are subsequently positioned to receive nut meats distributed thereover by means of a nut distributing mechanism generally indicated at 71. The nut distributing mechanism is carried in a frame structure including two pairs of vertically disposed uprights 72, one pair being mounted on each side stringer 12 of the main frame structure. The uprights of each pair are suitably connected adjacent their upper ends by a tie-bar 73 and also by intermediate bars 74 and 75. The tie-bars 73 on each side of the upwardly extending frame structure affords means for supporting within said frame structure a pair of hoppers 76 (Figs. 1 and 3) each of which is adapted to contain a supply of nut meats. As is perhaps best illustrated in Figs. 3 and 4, the hoppers 76 are spaced apart and each has a throat portion 77 of reduced dimensions formed substantially arcuate in horizontal section for a purpose to be made apparent presently.

A bracket 78 (Fig. 4) is securely mounted to and between the hoppers 76 and said bracket includes a bearing boss 79 within which is journaled the upper end of a vertical shaft 81. The shaft 81 carries on its lower end a turret comprised of a pair of measuring discs 82 and 83, the perimeter of which underlies the hopper throats 77. As is perhaps best illustrated in Fig. 4, the upper disc 82 is centrally apertured to fit freely over the lower extremity of the shaft 81 and it is provided with an integral hollow boss 84 that extends upwardly therefrom and is securely mounted, as by a pin 85, to the shaft 81 so as to be rotatable therewith. The other disc 83 likewise is provided with an axial opening to fit loosely over the shaft 81, beneath the disc 82, and a spring 86 interposed between the top surface of said disc 83 and the closed upper end of the boss 84 normally tends to urge the disc 83 downwardly away from the disc 82 for a purpose to become apparent presently.

The disc 83 rests at all times upon a floor plate 87 also loosely mounted on the shaft 81. This plate is however mounted so as not to rotate with the shaft but is adapted to be adjusted vertically relative to the disc 82 so as to raise or lower the lower disc 83 relative to the disc 82 all for a purpose to be explained presently. Adjustment of the plate 87 is obtained by manual adjustment of a lock nut 88 mounted on a threaded lower extremity of the shaft 81 and said plate 87 is held against rotation by means of straps 89 secured thereto and extending diametrically outwardly therefrom. The free end portions of the straps 89 are apertured to receive freely therethrough the lower extremities of a pair of depending studs 91 which are firmly anchored one in each bar 75. Each of the studs 91 is threaded on its lower extremity and receives for adjustment thereon a nut 92 which is adjusted in conjunction with adjustment of the lock nut 88 for varying the height or elevation of the floor plate 87.

The upper disc 82 has a plurality of circumferentially spaced openings 93 therein any two of which normally are located within the area of the open lower ends of each hopper throat 77 so as to receive a quantity of nut meats from the supply within the hoppers when the disc 82 is rotatably advanced therebeneath. The lower disc 83 is provided with similar openings 94. These openings preferably are larger in diameter than the openings 93 so as to receive therein downwardly extending peripheral flanges 95 surrounding the openings 93. It should be quite evident at this time that by adjusting the floor plate 87 vertically, the overall depth of the combined openings 93 and 94, or measuring cavities, is increased or decreased to thereby vary the capacity of said combined openings.

The floor plate 87 is provided with a pair of diametrically opposed flanged openings 96, each of which is arranged in vertical alignment with a respective one of the two rows of pans 55 moving therebeneath. In operation, the turret 82—83 is rotated step-by-step so as to progressively advance the measuring cavities 93, 94 out from beneath the hoppers and into registering alignment with the vending openings 96, whereupon the contents are discharged downwardly through the vending openings 96.

Movement of the turret 82—83 is accomplished by providing the shaft 81 with a bevel gear 97 that meshes at all times with a bevel gear 98 carried on a horizontal radially extending shaft 99, one end of which is journaled in a bearing 101 preferably forming a part of the bearing bracket 78, and the other end of which is journaled in a bearing 102 which may be formed integral with the strap 74. Step-by-step rotation of the shaft 99 is effected by providing said shaft with a ratchet wheel 103 (Fig. 6) adapted to have associated with it a pawl 104. The pawl 104 is pivotally mounted at 105 on a bell-crank lever 106 which lever includes an end portion 107 having connected thereto the upper end of a link 108 which extends downwardly and is connected at its lower end, by a pin 109, to the cam 66 (Fig. 1). The structure is such that the shaft 99 is operated only when there are trays 54 to receive nut meats discharged through the vending openings 96. To this end, a control switch 110 (Figs. 1 and 7) is mounted beneath the conveyor 21 in close proximity to the dispensing mechanism which switch has a control arm 111 that normally is held down so as to maintain the switch in open position so long as there are trays on the conveyor 21 for accomplishing this purpose. When the switch 110 is closed, in the absence of any tray being present thereover, a solenoid 112 carried on a tail portion 113 of the lever 106 is energized so as to pull the tail portion 114 of the pawl 104 downwardly, thus raising the pawl into a position where it will not engage the ratchet 103. When the solenoid is de-energized, a pull-spring 115 returns the pawl 104 to ratchet engaging position.

Nut meats dropping out of each vending opening 96 fall onto a distributing head 116 located therebelow in axial alignment therewith and are dispersed radially so as to be substantially uniformly distributed throughout the entire area of the product 56 contained in a pan 55 located therebeneath. Excessive radial dispersion of the nut meats is prevented by surrounding the head 116 with a wall 117, which wall is of a diameter slightly less than the diameter of the pan and preferably is supported in place rigidly by horizontally disposed radial straps 118. The distributing head 116 is supported centrally within the wall 117 by spokes 119.

Although the apparatus illustrated is provided with a pair of hoppers arranged to concurrently deliver nut meats to a plurality of the measuring cavities 93—94 in the turret 82—83 so as to effect distribution of nut meats concurrently on two rows of products passing beneath the dispensing mechanism, it should be quite evident that the mechanism may be provided with a single hopper and single measuring and vending openings so as to deliver nut meats to but a single row of articles passing therebeneath. Should it be desired to feed articles of reduced size beneath the nut dispensing mechanism, which will require a smaller quantity of nuts than the amount measured by the measuring cavities, said cavities may be reduced in size by fitting therein a sleeve 121 as indicated in broken lines in Fig. 4 thereby reducing the capacity thereof.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. An apparatus of the character described comprising, in combination, a container for material to be dispensed having an opening in its bottom, a movable plate having a portion at least underlying said opening to normally close the same, said plate having an opening therein, a second plate underlying said first plate and movable therewith, said second plate having an opening in register with the opening in the first plate, a flange integral with one of said plates surrounding the opening therein extending into the opening in the other plate, said registering openings defining a cavity to receive material from the container when the cavity is placed in register with the container bottom opening, a floor plate beneath the second plate normally closing the cavity bottom, spring means urging the second plate into face to face contact with the floor plate, means to adjust the relative positions of the first and second plates to vary the capacity of the cavity, a vending opening in the floor plate out of register with the container bottom opening, and means to move the first and second plates in unison so as to carry the cavity into register with the vending opening to discharge its contents.

2. An apparatus of the character described comprising, a hopper for material to be dispensed having an open bottom, a plate having an area disposed beneath said open bottom to normally close the same, means to rotate said plate, said plate having a plurality of spaced openings in said area, a second plate underlying said first-named plate and rotatable therewith, said second plate having openings in register with the first-named openings, said registering openings defining cavities to receive material from the hopper when the rotatable plates are moved to advance the cavities into register with the bottom opening, a floor plate upon which said second plate is seated to normally close said cavities, means to move said floor plate toward and away from the first-named plate so as to carry the second plate toward and away from the first plate to vary the capacity of the cavities, and a vending opening in the floor plate with which the material containing cavities are successively aligned during rotation so as to discharge their contents.

3. An apparatus of the character described comprising, a hopper for material to be dispensed having an open bottom, a plate having a marginal area disposed beneath said open bottom to normally close the same, means to move said plate, said plate having a plurality of spaced openings in its marginal area, a second plate underlying said first-named plate and rotatable therewith, said second plate having openings in register with the first-named openings, said registering openings defining cavities to receive material from the hopper when the plates are moved to advance the cavities into register with the bottom opening, a floor plate underlying said second plate to normally close said cavities, adjustable mounting means for said floor plate adapting it to be moved toward and away from the first-named plate so as to carry the second plate toward and away from the first plate to vary the capacity of the cavities, a vending opening in the floor plate with which the material containing cavities are successively aligned so as to discharge their contents, and a distributor arranged beneath the vending openings.

4. An apparatus of the character described comprising, a hopper for material to be dispensed having an open bottom, a disc-like plate having its peripheral margin disposed beneath said open bottom to normally close the same, means to rotate said plate, said plate having a plurality of circumferentially spaced openings therein, a second disc-like plate underlying said first-named plate and rotatable therewith, said second plate having openings in register with the first-named openings, there being flanges surrounding the openings in one plate that extend into the openings in the other plate, said registering openings defining cavities to receive material from the hopper when the rotatable plates are moved to advance the cavities into register with the bottom opening, a floor plate upon which said second plate is seated to normally close said cavities, adjustable mounting means for said floor plate adapting it to be moved toward and away from the first-named plate so as to carry the second plate toward and away from the first plate to vary the capacity of the cavities, a vending opening in the floor plate with which the material containing cavities are successively aligned during rotation so as to discharge their contents, a distributor arranged beneath the vending openings, and means to confine the material distributed within a prescribed area.

5. A measuring and dispensing apparatus comprising a container for the material to be dispensed, said container having a discharge opening in the lower portion thereof, measuring means arranged beneath said discharge opening, said measuring means having a measuring cavity extending therethrough, a stationary planar member located below said measuring means and in contact therewith and constituting the bottom of said cavity, said stationary member having a vending opening extending therethrough, said vending opening being out of registering alignment with said discharge opening, means for moving said measuring means to advance said measuring cavity into communication with said discharge opening so as to receive material from the container and for then moving said measuring means to advance said measuring cavity out of communication with said discharge opening and into communication with said vending opening, and adjustable means for selectably varying the capacity of said measuring cavity.

6. An apparatus as recited in claim 5 wherein said means for varying the capacity of said measuring cavity comprises means for varying the distance between the uppermost portion of said cavity and said stationary member.

7. An apparatus as recited in claim 5 wherein said measuring means comprises a pair of superimposed plates each having an aperture extending therethrough in alignment with the aperture in the other plate, said aligned apertures cooperating to form said measuring cavity, one of said plates having a flange extending around the periphery of its aperture and projecting into the aperture of the other plate, said means for varying capacity of said measuring cavity comprising adjustable means for selectably varying the relative spacing of said plates with respect to each other.

8. An apparatus as recited in claim 5 wherein said measuring means comprises a plate having an aperture extending therethrough, an element having an opening therethrough in communication with said aperture and having a flange portion extending peripherally around said opening and telescopically slidable within said aperture, said opening and said aperture each constituting a portion of said measuring cavity, said means for varying the capacity of said measuring cavity comprising adjustable means for selectably varying the extent to which said flange portion extends into said aperture.

9. A measuring and dispensing apparatus comprising a container for the material to be dispensed, said container having a discharge opening in the lower portion thereof, a first plate extending in a horizontal plane below said discharge opening, a second plate below said first plate and in parallel relation thereto, a stationary planar member having a horizontal bearing surface on the upper portion thereof, said second plate resting upon said bearing surface, means mounting said plates for rotary movement about a common vertical axis, means preventing relative rotary movement of one of said plates with respect to the other plate, said stationary member having a vending opening extending therethrough and horizontally offset from said discharge opening, each of said plates having an aperture extending therethrough and in vertical alignment with the aperture of the other plate, one of said plates having a flange-like sleeve extending peripherally around the aperture of said one plate and projecting into the aperture of the other plate, said apertures and said discharge opening and said vending opening being substantially equidistant from said vertical axis of rotation, adjustable means for selectably varying the vertical distance between said plates, and means for rotating said plates in unison so as to advance said apertures successively into register with the discharge opening to receive material therefrom and then into register with said vending opening to discharge the material therethrough.

References Cited in the file of this patent

UNITED STATES PATENTS

| | | |
|---|---|---|
| 1,513,373 | Corporon | Oct. 28, 1924 |
| 2,097,914 | Cooper et al. | Nov. 2, 1937 |
| 2,260,686 | Segrin | Oct. 28, 1941 |
| 2,319,865 | James | May 25, 1943 |
| 2,584,726 | McOmber | Feb. 5, 1952 |
| 2,659,338 | Harrison | Nov. 17, 1953 |
| 2,681,637 | Simpson | June 22, 1954 |
| 2,685,393 | Thompson | Aug. 3, 1954 |